United States Patent
Shindou

(10) Patent No.: US 7,159,548 B2
(45) Date of Patent: Jan. 9, 2007

(54) VARIABLE VALVE ACTUATING SYSTEM AND METHOD

(75) Inventor: Shigeki Shindou, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 160 days.

(21) Appl. No.: 10/953,365

(22) Filed: Sep. 30, 2004

(65) Prior Publication Data
US 2005/0092272 A1 May 5, 2005

(30) Foreign Application Priority Data
Oct. 29, 2003 (JP) ............................. 2003-368377

(51) Int. Cl.
*F01L 1/34* (2006.01)
(52) U.S. Cl. .............................. 123/90.16; 123/90.15; 123/90.17; 123/90.31
(58) Field of Classification Search ............. 123/90.15, 123/90.16, 90.17, 90.31
See application file for complete search history.

(56) References Cited

U.S. PATENT DOCUMENTS

| 2002/0023604 A1* | 2/2002 | Nohara et al. | 123/90.15 |
| 2003/0131814 A1* | 7/2003 | Tsujimura et al. | 123/90.17 |
| 2004/0231624 A1 | 11/2004 | Shindou et al. | |

FOREIGN PATENT DOCUMENTS

| JP | 5-98916 A | 4/1993 |
| JP | 7-139378 A | 5/1995 |
| JP | 2000-034913 A | 2/2000 |
| JP | 2000-130196 A | 5/2000 |
| JP | 2000-234533 A | 8/2000 |
| JP | 2003-49671 A | 2/2003 |
| JP | 2003-206767 A | 7/2003 |

OTHER PUBLICATIONS

U.S. Appl. No. 10/834,119, filed Apr. 29, 2004, Shindou et al.

* cited by examiner

*Primary Examiner*—Thomas Denion
*Assistant Examiner*—Zelalem Eshete
(74) *Attorney, Agent, or Firm*—Foley & Lardner LLP

(57) ABSTRACT

A variable valve actuating apparatus for an internal combustion engine, includes an intake valve timing control device to vary a center phase of an intake valve operation angle, an exhaust valve timing control device to vary a center phase of an exhaust valve operation angle, and an intake valve operation angle control device to vary an intake valve operation angle of the engine. A fail-safe control system is arranged to detect a malfunction of the exhaust valve timing control device; and to adjust an intake valve opening timing at or after an exhaust valve closing timing of the engine, upon detection of the malfunction, by operating at least one of the intake valve control device and the intake valve operation angle control device.

10 Claims, 9 Drawing Sheets

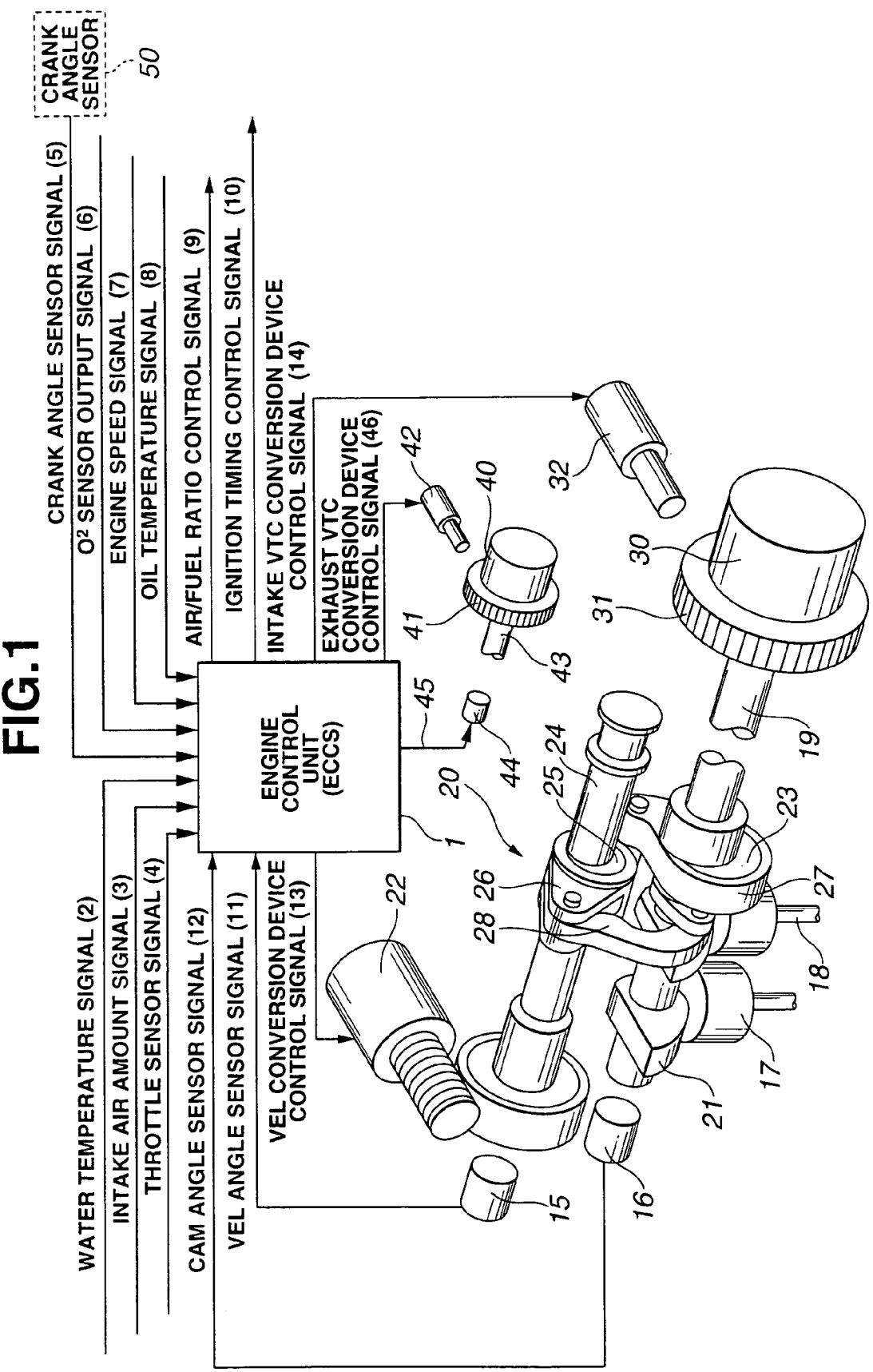

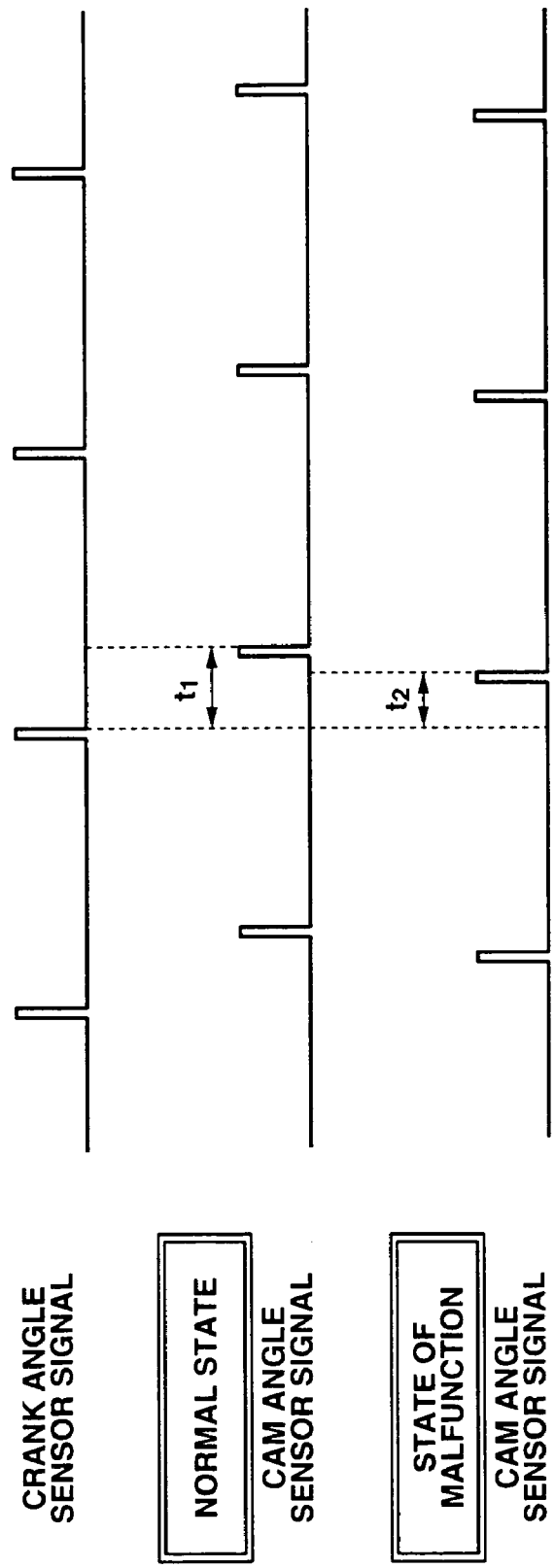

VARIABLE VALVE ACTUATING SYSTEM AND METHOD

BACKGROUND OF THE INVENTION

The present invention relates to variable valve actuating system and method for an internal combustion engine equipped with variable valve timing control systems for intake and exhaust valves and an intake valve operation angle varying system, and more specifically to a fail-safe control technique at the time of malfunction in the exhaust variable valve timing control system.

For improvement in output and fuel consumption, and exhaust emission control of an internal combustion engine, a variable valve control mechanism is arranged to vary an intake or exhaust valve lift characteristic. A patent document 1 (Published Japanese Patent Application, Kokai No. H07 (1995)-139378) discloses a valve actuation system arranged to decrease a valve overlap forcibly when a failure is detected in a control system for the variable valve timing mechanism, to maintain driving performance. A patent document 2 (Published Japanese Patent Application Kokai No. 2000-130196) discloses a system for decreasing or eliminating the valve overlap forcibly by controlling the operation of a valve operation angle varying mechanism for varying an intake/exhaust valve lift and operation angle when an abnormal condition is detected in an internal combustion engine. A patent document 3 (Published Japanese Patent Application Kokai No. 2003-49671) discloses a system which includes intake and exhaust variable valve timing control mechanisms. When an abnormal condition is detected in one of the variable valve timing mechanisms, this system controls the respective variable valve timing control mechanisms by using data for abnormal situation. For example, the system fixes the abnormal variable valve timing mechanism in the most retarded position and controls the other variable valve timing mechanism by using an operation map for the abnormal situation. Alternatively, both variable timing mechanisms are fixed at the most retarded positions.

SUMMARY OF THE INVENTION

In an internal combustion engine, especially a gasoline engine, it is desirable to adjust the intake and exhaust valve opening and closing timings widely to improve the fuel consumption, output and exhaust emission control performance. Accordingly, some engines are equipped with variable valve timing mechanisms for both of the intake and exhaust valves, and an intake valve operation angle varying mechanism capable of varying an intake valve operation angle or valve lift (quantity). None of the above-mentioned patent documents treat a problem of a fail-safe in such a system.

It is an object of the present invention to provide a variable valve actuating apparatus and/or method for performing an adequate fail-safe control operation.

According to one aspect of the present invention, a variable valve actuating apparatus for an internal combustion engine, comprises: an intake valve timing control device to vary a center phase of an intake valve operation angle of the engine; an exhaust valve timing control device to vary a center phase of an exhaust valve operation angle of the engine; an intake valve operation angle control device to vary an intake valve operation angle of the engine; a malfunction detecting device to detect a malfunction of the exhaust valve timing control device; and a fail-safe control device to adjust an intake valve opening timing of the engine at or after an exhaust valve closing timing of the engine, upon detection of the malfunction of the exhaust valve timing control device, by operating at least one of the intake valve timing control device and the intake valve operation angle control device.

According to another aspect of the invention, a variable valve actuation control method for an internal combustion engine, comprises: detecting a malfunction of an exhaust valve timing control for the engine; and performing a fail-safe operation to adjust an intake valve opening timing at or after an exhaust valve closing timing, upon detection of the malfunction of the exhaust valve timing control, by altering at least one of a center phase of an intake valve operation angle and the intake valve operation angle.

BRIEF DESCRIPTION OF THE DRAWINGS

FIG. 1 is a schematic view showing a variable valve actuating system or apparatus according to first through fourth embodiments of the present invention.

FIG. 2 is a time chart illustrating operation to detect a malfunction in an exhaust variable valve timing control mechanism.

DETAILED DESCRIPTION OF THE INVENTION

Figure 3A:
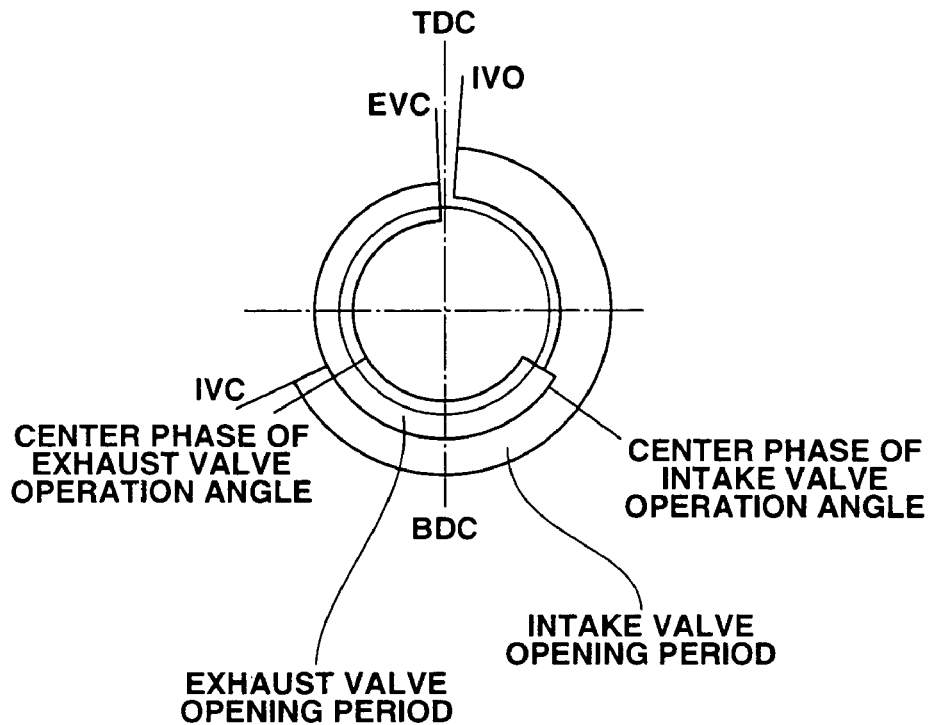
FIGS. 3A and 3B are valve timing diagrams for illustrating valve opening periods (or durations) and valve opening and closing timings for intake and exhaust valves.

FIG. 1 shows an internal combustion engine equipped with a valve actuating system or apparatus according to first through fourth embodiments of the present invention. In this example, each cylinder of the engine is provided with a pair of intake valves 18 and a pair of exhaust valves.

The valve actuating system according to each of these embodiments includes first and second variable intake valve control mechanisms or devices for varying a valve lift characteristic of intake valves 18 in two different manners, and a variable exhaust valve control mechanism or device for varying a valve lift characteristic of exhaust valves.

In this example, the first variable intake valve control mechanism is a variable intake valve timing control (intake VTC)(mechanism or device) 30 for varying a center phase (or center angular position) of operation of intake valves 18 (intake camshaft) or valve timing of intake valves 18. The second variable intake valve control mechanism of this example is an intake variable valve event and lift control (VEL) 20 (mechanism or device) which is an intake valve operation angle varying mechanism capable of varying an intake valve operation angle and an intake valve lift (quantity) continuously. The variable exhaust valve control mechanism of this example is a variable exhaust valve timing control (exhaust VTC)(mechanism or device) 40 for varying a center phase (or center angular position) of operation of the exhaust valves or valve timing of the exhaust valves.

An intake cam shaft or intake valve drive shaft 19 is arranged to receive rotation from a crank shaft of the engine through a pulley or sprocket. Therefore, intake cam shaft 19 rotates about its own axis in timed relationship with the crank shaft. A rocker cam 21 is swingably mounted on intake cam shaft 19 just above a valve lifter 17 of each intake valve 18.

Intake VEL 20 shown in FIG. 1 includes an eccentric circular cam 23 fixedly or integrally formed on intake cam shaft 19 so that the center of the circular cam is off the center axis of cam shaft 19; a control shaft 24 extending in parallel to intake cam shaft 19 in the cylinder row direction of the engine; a circular control cam 25 fixedly or integrally formed on control shaft 24 in such an eccentric manner that the center of the cam is off the center axis of control shaft 24; a rocker lever 26 including a center portion fit over control cam 25, and swingably mounted on control cam 25; a first link 27 shaped like a ring fit over eccentric cam 23 in such a manner that first link 27 can rotate relative to eccentric cam 23, and arranged to connect eccentric cam 23 and a first arm of rocker lever 26; a rod-shaped second link 28 connecting a second arm of rocker lever 26 and an end of rocker cam 21; and a VEL conversion device 22 for varying a rotational angle of control shaft 24. In this example, VEL conversion device 22 is an electrically driven actuator.

When intake cam shaft 19 is driven by the crank shaft, intake cam shaft 19 rotates, and eccentric cam 23 mounted on this rotating shaft 19 causes first link 27 to move approximately in a manner of translational motion with one end of first link 27 being rotated about the axis of intake cam shaft 19. This translational motion of first link 27 is then converted to swing motion of rocker lever 26, and second link 28 causes rocker cam 21 to swing within a swing angle range. This rocker cam 21 pushes down valve lifter 17 for intake valve 18, and thereby opens intake valve 18.

VEL conversion device 22 is arranged to vary the rotational angle of control shaft 24, and thereby rotates the center of control cam 25 about which rocker lever 26 swings, with respect to the axis of control shaft 24. By this rotational displacement of the center of control cam 25, VEL conversion device 22 can change the initial attitude of rocker cam 21 through links 27 and 28. (The initial attitude is a center phase of a swing range.) In this way, VEL conversion device or actuator 22 can continuously vary the operating angle and valve lift quantity of intake valve 18 while the center phase (or the phase of the center angular position) of the operation angle of intake valve 18 with respect to the crank angle is held substantially constant.

In the thus-constructed VEL mechanism 20, rocker lever 26 and links 27 and 28 are arranged closely around intake cam shaft 19, to the advantage to the compactness of the mechanism and the ease in installation in an engine. Most of members are in contact with one another over an area, face to face. This construction is advantageous in lubrication, durability and reliability, without the need for biasing means such as a return spring. For example, the bearing interface portion between eccentric cam 23 and first link 27, and the bearing interface portion between control cam 25 and rocker lever 26 have substantial contact areas. This VEL control mechanism 20 has a direct drive type valve operating layout in effect, so that it is possible to improve the rotation limit with a simple and compact construction.

Intake VTC 30 and exhaust VTC 40 can employ one of know VTC mechanisms. A Published Japanese Patent Application Publication No. H05(1993)-98916 discloses a variable valve timing control mechanism which can be employed as intake VTC 30 and exhaust VTC 40. Among known VTC mechanisms capable of continuously varying the phase of the center of the valve lift operating angle, there are a type using vane, and a type using helical splines.

In the example shown in FIG. 1, intake VTC (mechanism or device) 30 includes an outside rotary member 31 having a cam pulley (or a sprocket) rotatable in timed relation with the crankshaft, and an inside rotation member (not shown) received rotatably in outside rotary member 31, and connected with intake cam shaft 19 so that the inside rotary member rotates as a unit with intake cam shaft 19. An intake VTC conversion device (or VTC actuator) 32 is arranged to rotate the outside rotary member 31 and the inside rotary member relative to each other. By so doing, intake VTC conversion device 32 can advance and retard an intake valve timing, that is, a phase (or centre phase) of a center angular position of the intake operation angle with respect to the crank angle. In this example, intake VTC conversion device 32 is a hydraulic actuator.

Similarly, exhaust VTC (mechanism or device) 40 includes an outside rotary member 41 having a cam pulley (or a sprocket) rotatable in timed relation with the crankshaft, and an inside rotation member (not shown) received rotatably in outside rotary member 41, and connected with an exhaust cam shaft 43 provided with a fixed cam for driving an exhaust valve so that the inside rotary member rotates as a unit with exhaust cam shaft 43. An exhaust VTC conversion device (or VTC actuator) 42 is arranged to rotate the outside rotary member 41 and the inside rotary member relative to each other. By so doing, exhaust VTC conversion device 42 can advance and retard an exhaust valve timing, that is, the phase (or centre phase) of a center angular position of the exhaust operation angle with respect to the crank angle. In this example, exhaust VTC conversion device 42 is a hydraulic actuator. In this example, moreover, intake VTC 30 and exhaust VTC 40 are of the hydraulically operated type, and both VTC 30 and 40 are connected with a single common oil pump as a source of hydraulic pressure.

An engine control unit (ECCS C/U) 1 is composed of a known digital computer including CPU, ROM, RAM and input/output interface, and arranged to store and execute various control processes as explained later. Information on vehicle operating conditions, needed for the control processes is inputted to engine control unit 1, from various sensors.

Input signals are: a water temperature signal 2 from a water temperature sensor; an intake air quantity signal 3 from an air flowmeter; a throttle sensor signal 4 from a throttle sensor; a crank angle sensor signal 5 from a crank angle sensor 50; an oxygen sensor signal 6 from an oxygen sensor disposed in an exhaust passage of the engine; a rotation signal or engine speed signal 7; a signal 8 from an oil temperature sensor; a signal 11 from a VEL angle sensor 15 for sensing the rotational angle of control shaft 24; a signal 12 from an intake cam angle sensor 16 for sensing the rotational angle of intake cam shaft 19; and a signal 45 from an exhaust cam angle sensor 44 for sensing the rotational angle of exhaust cam shaft 43. In accordance with the thus-collected input information on engine operating conditions, engine control unit 1 produces control signals 9, 10, 13, 14 and 46, and delivers the respective control signals to an actuator of a fuel injection system, an actuator of an ignition system, VEL conversion device 22, and intake and exhaust VTC conversion devices 32 and 42 to perform the respective control actions. In this way, engine control unit 1 serves as a controller of a variable valve timing control system including the sensors and actuators. Moreover, engine control unit 1 serves as a fail-safe control device for performing a fail-safe operation, as mentioned later.

Figure 3B:
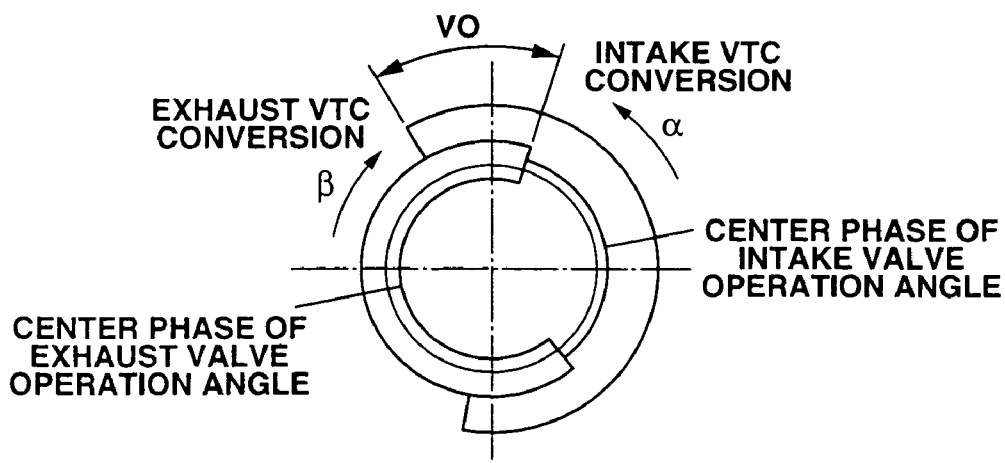

FIGS. 3A and 3B show intake and exhaust valve opening and closing timings and opening periods or durations (operation angles) in the form of valve timing diagram. In a high speed, high load region, for example, the valve actuating system produces a large valve overlap VO in which the intake and exhaust valves are both open, as shown in FIG. 3B, to improve the intake charging efficiency. In this example shown in FIGS. 3A and 3B, the valve actuating system increases the valve overlap VO, from the set state shown in FIG. 3A, by retarding the exhaust center phase (the phase of the center point of the exhaust valve operation), advancing the intake center phase (the phase of the center position of the intake valve operation), and increasing the operation angle of the intake valve with intake VEL 20.

FIGS. 4~7 illustrate control operations in first to fourth embodiments according to the present invention in terms of valve timing diagram, respectively, and FIGS. 8–11 show control processes in the first to fourth embodiments, respectively, in terms of flowchart.

Steps S11~S14 are common to the first through fourth embodiments. As shown in each of FIGS. 8~11, at S11, control unit 1 determines a target conversion angle which is a target value of the center phase of the valve operation angle for each of intake VTC 30 and exhaust VTC 40, in accordance with the sensed engine operating conditions. This target conversion angle corresponds to a target value t1 (shown in FIG. 2) of a phase difference of the intake or exhaust cam shaft 19 or 23 with respect to the crank angle. At S12, control unit 1 drives intake VTC 30 and exhaust VTC 40 toward the respective target conversion angles, by sending the control signals representing the respective target conversion angles to VTC conversion devices 32 and 42.

Step S13 is a step (malfunction detecting means or section) to detect a malfunction of exhaust VTC 40 (including abnormality and failure), that is an abnormal condition in which exhaust VTC system 40 cannot operate properly due to sticking in the hydraulic conversion device or for some other reason. In this example, control unit 1 calculates an actual conversion angle of exhaust VTC 40 from crank angle sensor signal 5 and exhaust cam angle sensor signal 45, and determines the existence or nonexistence of a malfunction of exhaust VTC 40 by comparing the actual conversion angle and the above-mentioned target conversion angle. This actual conversion angle corresponds to a difference t2 (shown in FIG. 2) of the cam angle sensor signal with respect to the crank angle sensor signal, that is, a phase difference of the cam shaft with respect to the crank angle. When t2 is not equal to t1, and the difference between t2 and t1 is greater than a predetermined value, control unit 1 concludes that there is a malfunction in exhaust VTC 40, and hence proceeds from S13 to S14. In this example, moreover, this system warns the driver of occurrence of the malfunction by means of a warning device such as a warning lamp. In this example, exhaust cam angle sensor 44 serves as a malfunction detecting device to sense a condition such as an engine operating condition to detect a malfunction in exhaust VTC 40.

When a malfunction in exhaust VTC 40 is detected at S13, control unit 1 proceeds to step S14 and the following steps, and performs a fail-safe control operation including an operation to avoid a valve overlap (fail-safe means). At S14, control unit 1 calculates a malfunction position of exhaust VTC 40 in accordance with crank angle sensor signal 5 and exhaust cam angle sensor signal 45. The malfunction position is an exhaust centre phase θ of a center angular position of the exhaust valve operation angle. The operations of S11~S14 are the same among all the embodiments.

Figure 4:
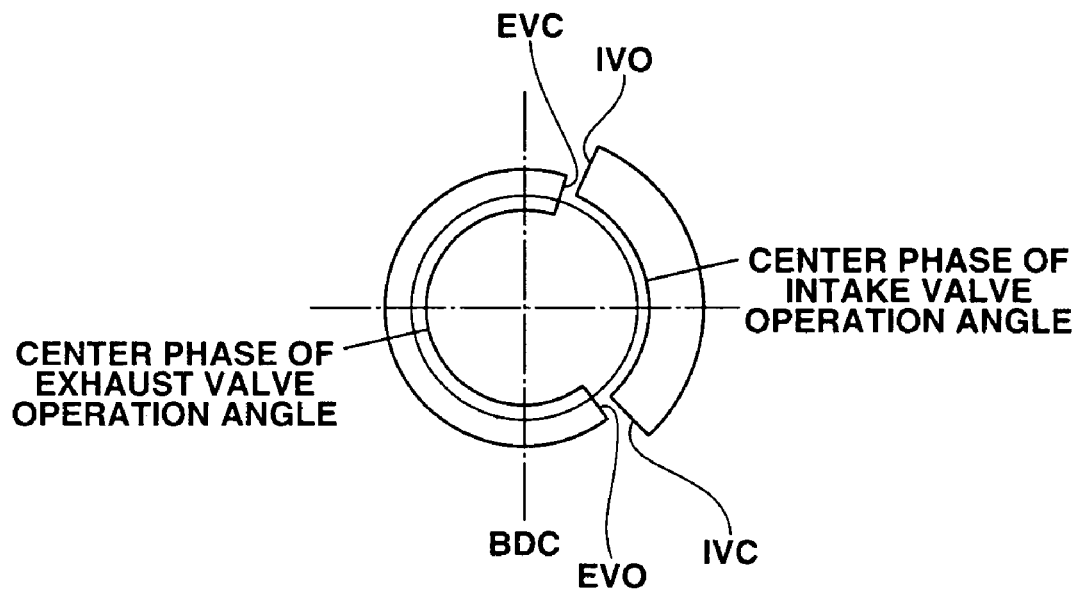
FIG. 4 is a valve timing diagram for illustrating the intake and exhaust valve opening periods and valve opening and closing timings in the first embodiment.
Figure 8:
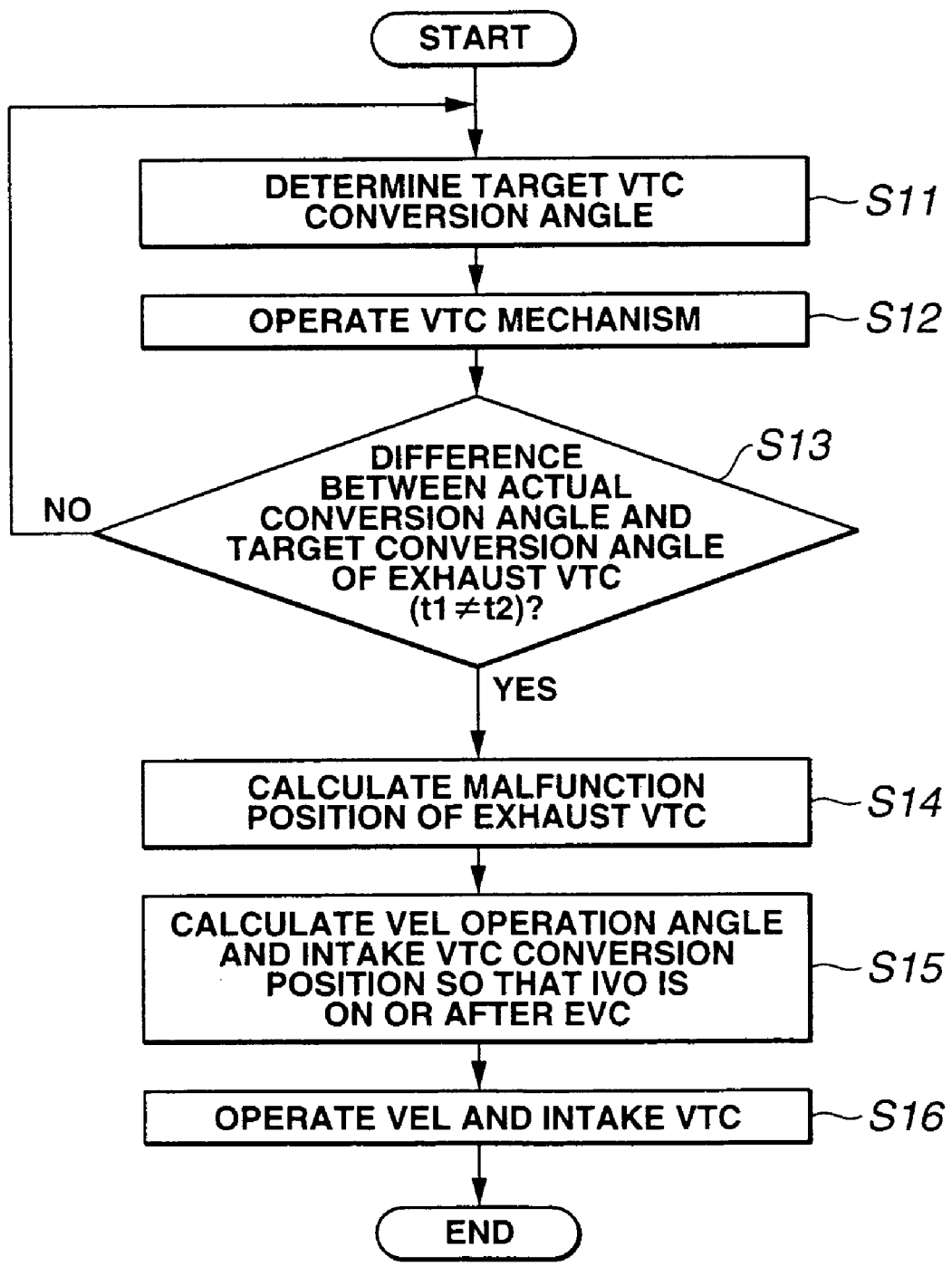
FIG. 8 is a flowchart showing a control process according to the first embodiment of the present invention.

At step S15 following S14, as shown in FIG. 8, control unit 1 calculates the target angles for intake VTC 30 and intake VEL 20 required to make the intake valve opening timing IVO coincident with or later than the exhaust closing valve timing EVC, that is, to eliminate a valve overlap VO in which the intake and exhaust valves are both open simultaneously. The method of calculating the target angles differs in the embodiments. In the first embodiment, as shown in FIG. 4, the control system shifts IVO to a point near EVC (at or slightly after EVC), mainly by operating the electric and hence responsive intake VEL 20 to a smaller operation angle and a smaller valve lift.

At step S16, control unit 1 delivers the control signals corresponding to the target angles calculated at S15, respectively, to intake VTC conversion device 32 and VEL conversion device 22, and thereby drives intake VTC 30 and intake VEL 20 to achieve the respective targets.

In this way, when a malfunction is detected in exhaust VTC 40, this valve timing control system drives at least one of intake VTC 30 and intake VEL 20, and eliminates the valve overlap VO. Therefore, the control system can reliably prevent back flow of residual gas due to the valve overlap to the intake side even at an engine restart operation or at a rapid deceleration in which the engine speed decreases rapidly due to hard braking. Therefore, this control system can provide good ignitability and stable combustion, and avoid misfire and poor starting operation.

Especially, in the first embodiment, the control system responds to a malfunction detection signal (YES of S13) indicating detection of malfunction, by driving the quick, responsive electric intake VEL 20 to a smaller operation angle and a smaller valve lift, without using the hydraulic intake VTC 30. Therefore, the response characteristic and reliability in the control are superior.

Figure 5:
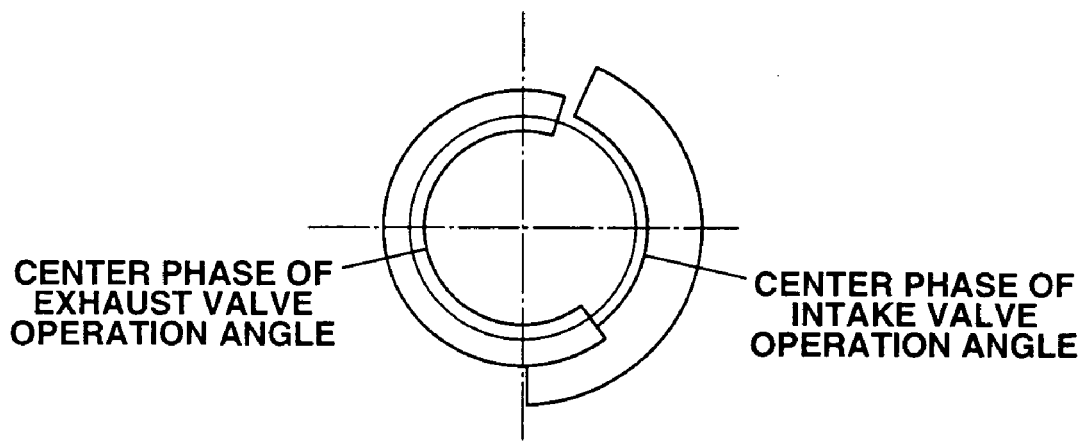
FIG. 5 is a valve timing diagram for illustrating the intake and exhaust valve opening periods and valve opening and closing timings in the second embodiment.
Figure 9:
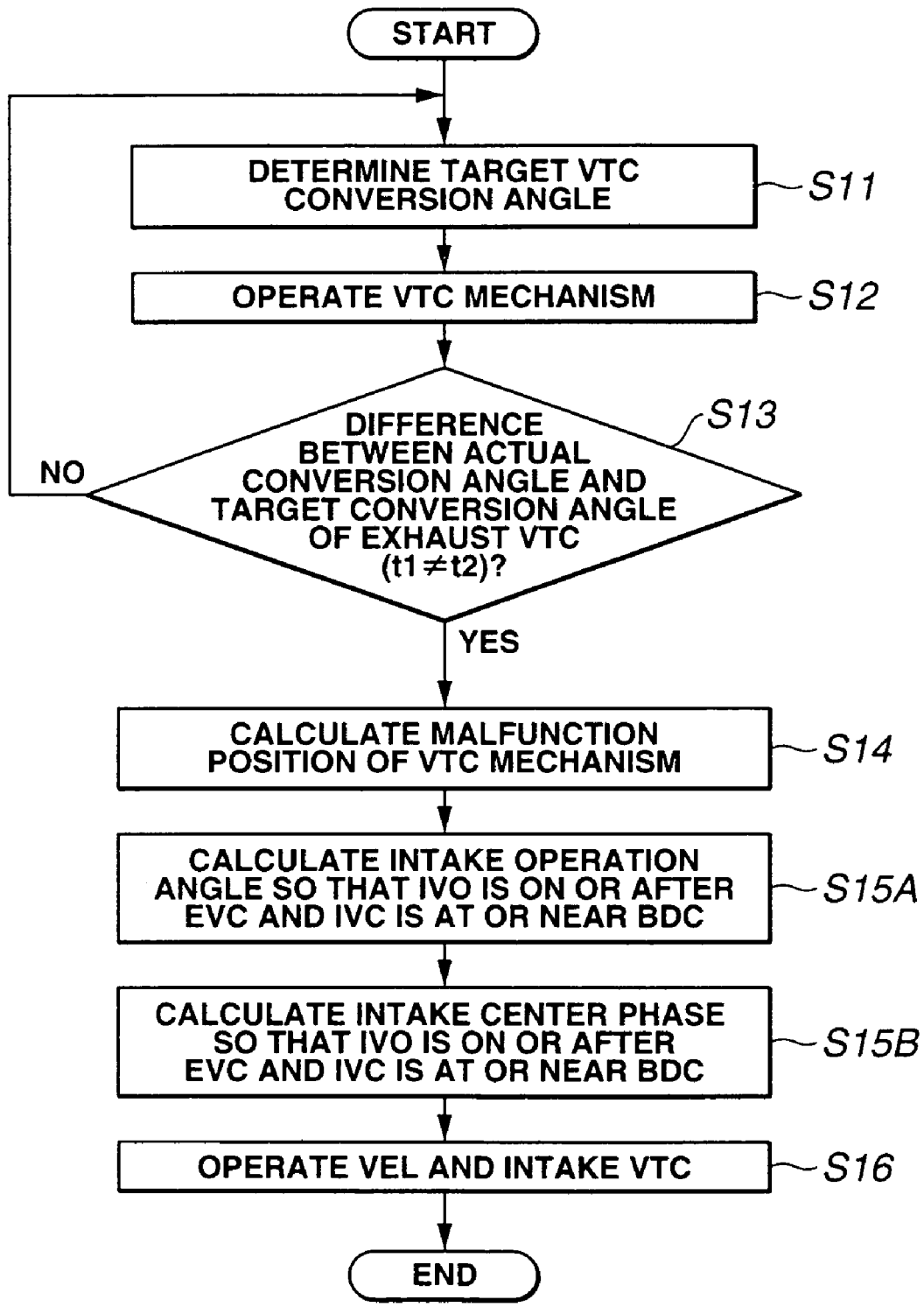
FIG. 9 is a flowchart showing a control process according to the second embodiment.

In the second embodiment, as shown in FIGS. 5 and 9, upon detection of a malfunction in exhaust VTC 40 (S13), control unit 1 calculates a target value of an intake operation angle for intake VEL 20 (at S15A) and a target value of the phase of the center angular position of the intake VTC (at S15B) so that IVO is on or after EVC (more specifically, IVO is coincident with EVC or slightly later than EVC), and at the same time, the intake valve closing timing IVC is near bottom dead center BDC. To achieve the thus-calculated target values, control unit 1 drives intake VEL 20 and intake VTC 30 (at S16).

In the second embodiment, when a malfunction is detected in exhaust VTC 40, this valve timing control system can provide stable combustion by shifting IVO toward EVC as in the first embodiment. Moreover, the system according to the second embodiment increases the compression ratio by shifting IVC toward BDC, and thereby further improve the combustion stability.

In the third and fourth embodiments, intake VTC 30 is held fixedly in an initial position when a malfunction is detected in exhaust VTC 40. Intake VTC 30 and exhaust VTC 40 are both the hydraulic devices using the single common oil pump as a common hydraulic pressure source. Therefore, in the state in which a malfunction is present in exhaust VTC 40, intake VTC of the same hydraulic type could suffer a malfunction like exhaust VTC 40. Specifically when both VTCs 30 and 40 are of the hydraulically operated type, the intake side and exhaust side could be both affected into a state of malfunction, by an abnormal condition such as clogging of foreign object in an oil passage. Therefore, the system of each of the third and fourth embodiments is arranged to fix intake VTC 30 in the initial position upon detection of a malfunction of exhaust VTC 40.

Figure 6:
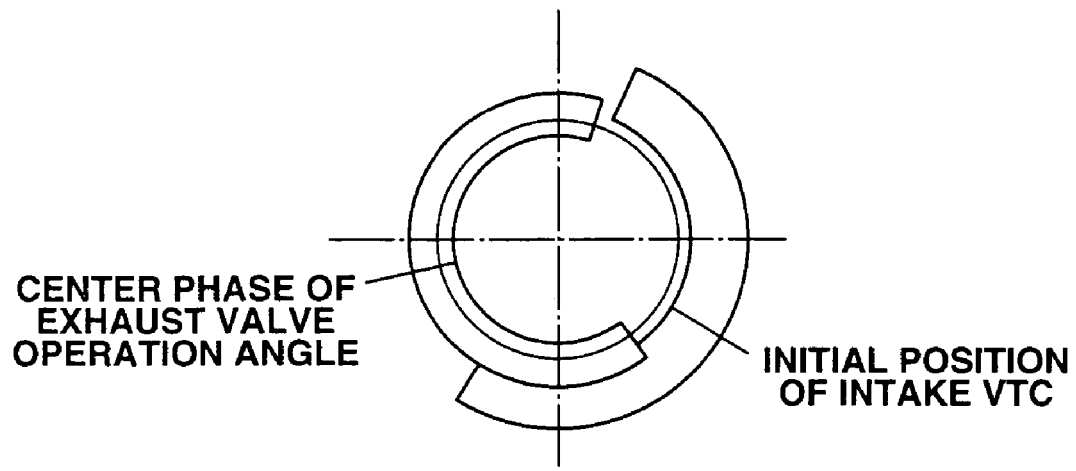
FIG. 6 is a valve timing diagram for illustrating the intake and exhaust valve opening duration and valve opening and closing timings in the third embodiment.
Figure 10:
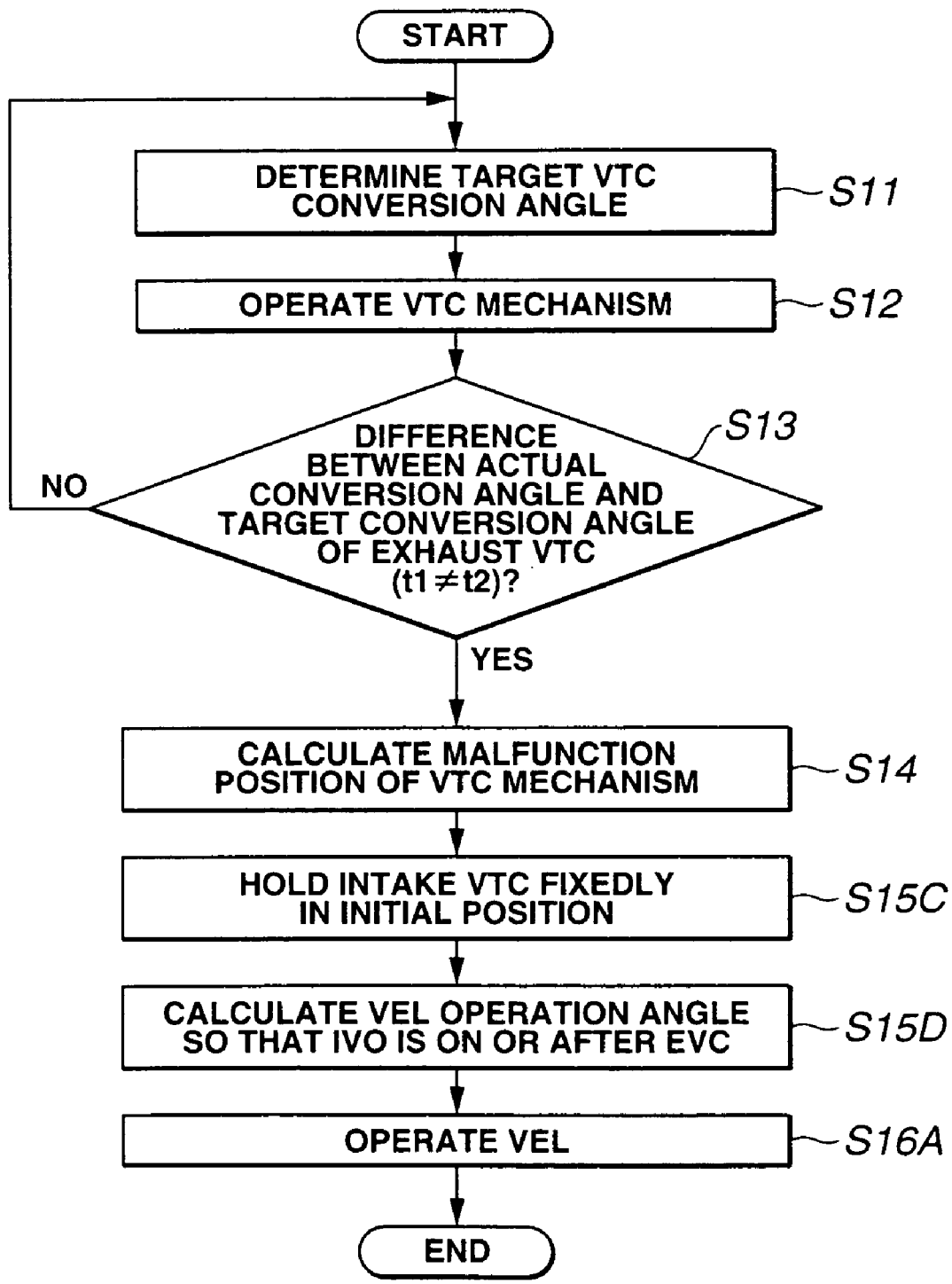
FIG. 10 is a flowchart showing a control process according to the third embodiment.

In the third embodiment, as shown in FIGS. 6 and 10, upon detection of a malfunction in exhaust VTC 40 (S13), control unit 1 first proceeds to step S15C. At S15C, control unit 1 holds the intake VTC fixedly in the initial position that is the most retarded position, and prevents movement of intake VTC 30 since then. That is, the target value for intake VTC 30 is set and invariably held equal to the initial value representing the most retarded position. At a next step S15D, control unit 1 determines a target value of an intake operation angle for intake VEL 20 so that IVO is on or after EVC (more specifically, IVO is coincident with EVC or slightly later than EVC), by using the malfunction position of exhaust VTC 40 calculated at S14, and the initial position of intake VTC 30. Then, at step S16A, control unit 1 drives intake VEL 20 to achieve the thus-determined target.

In the third embodiment, when a malfunction is detected in exhaust VTC 40, this valve timing control system can provide stable combustion by shifting IVO toward EVC as in the first embodiment. Moreover, by fixing the intake VTC 30. in the initial position, the system according to the third embodiment can eliminate the valve overlap VO securely even if intake VTC 30 is unable to operate properly. Thus, the third embodiment is advantageous in stability and reliability.

Figure 7:
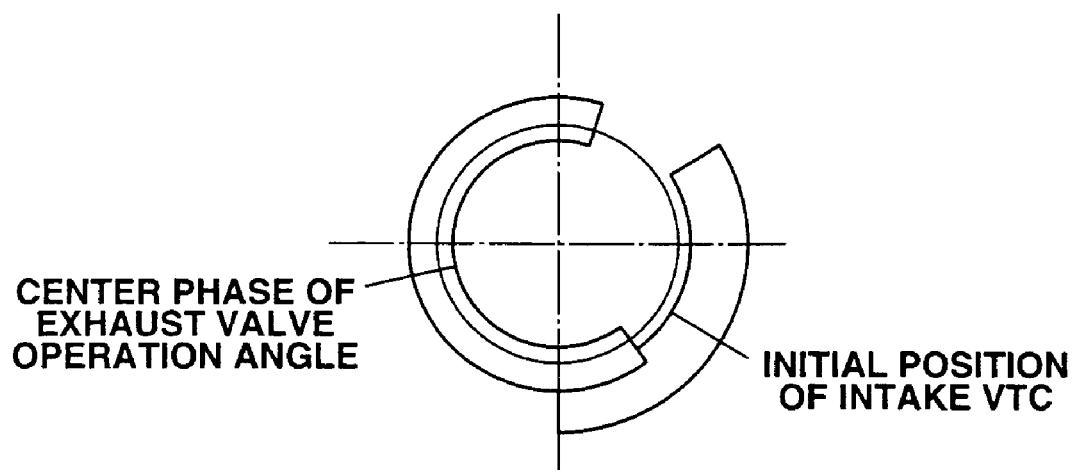
FIG. 7 is a valve timing diagram for illustrating the intake and exhaust valve opening periods and valve opening and closing timings in the fourth embodiment.
Figure 11:
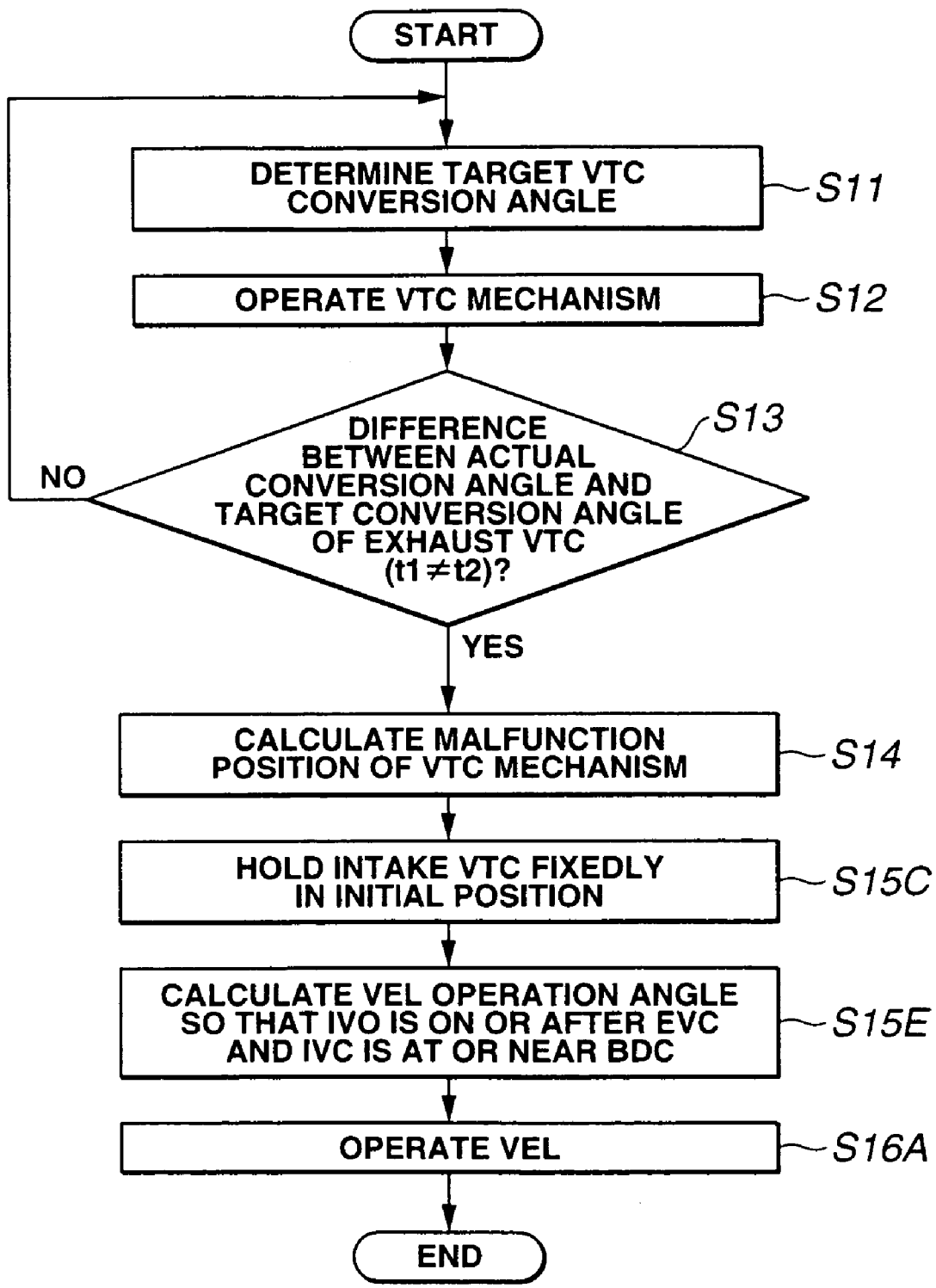
FIG. 11 is a flowchart showing a control process according to the fourth embodiment.

In the fourth embodiment, as shown in FIGS. 7 and 11, upon detection of a malfunction in exhaust VTC 40 (S13), control unit 1 first holds the intake VTC fixedly in the initial (most retarded) position and prevent movement of intake VTC 30 thereafter, at S15C. That is, the target value for intake VTC 30 is held equal to the initial value representing the most retarded position. At a next step S15E, control unit 1 determines a target value of an intake operation angle for intake VEL 20 so that IVC is in the vicinity of BDC, by using the malfunction position of exhaust VTC 40 calculated at 514, and the initial position of intake VTC 30. Then, at step S16A, control unit 1 drives intake VEL 20 to achieve the thus-determined target.

In the fourth embodiment, when a malfunction is detected in exhaust VTC 40, this valve timing control system can improve the combustion stability with a higher compression ratio by setting IVC near BDC . Moreover, by fixing the intake VTC 30 in the initial position, the system according to the fourth embodiment can set the intake valve closing timing IVC securely near BDC even if intake VTC 30 is unable to operate properly. Thus, the fourth embodiment is advantageous in stability and reliability. Since intake VTC 30 is held at the most retarded position, IVO is retarded sufficiently after EVC, so that the valve overlap is eliminated to provide stable ignition and stable combustion.

An engine restart operation after occurrence of malfunction in exhaust VTC 40 is liable to undergo trouble because the control of valve timing tends to become inaccurate due to the malfunction of exhaust VTC 40. Therefore, it is optional to perform the fail-safe control operation (S15, S15A~S15E) to avoid the valve overlap when the engine is restarted after detection of malfunction in exhaust VTC 40. In this case, the control system can reduce the amount of the residual gas due to the valve overlap, and ensure a sufficiently high compression ratio. Therefore, the system can improve the ignitability and the combustion stability, and increase the engine speed stably into the idle speed region.

In each of the first to fourth embodiments, in a high engine load region, the fail-safe control operation to avoid the valve overlap could increase the pumping loss and deteriorate the fuel consumption since the back flow of the residual gas to the intake side is prevented by the fail-safe control operation. Therefore, it is preferable to inhibit the fail-safe control operation in the high engine load region, and to perform the fail-safe control operation only in low and medium engine load regions. In this case, for example, step S13 is arranged to determine whether the engine load is in the low and medium regions, in addition to the examination to detect a malfunction in exhaust VTC 40. Then, control unit 1 performs the fail-safe control operation (S15, S15A~S15E) only when a malfunction is detected in exhaust VTC 40 and at the same time the engine load is in the low and medium load regions.

The invention is not limited to the illustrated embodiments. Various modifications and variations are possible within the scope of the present invention. For example, the intake VTC and exhaust VTC may be both electrical devices, instead of the hydraulic type.

This application is based on a prior Japanese Patent Application No. 2003-368377 filed on Oct. 29, 2003. The entire contents of this Japanese Patent Application No. 2003-368377 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A variable valve actuating apparatus for an internal combustion engine, comprising:
    an intake valve timing control device to vary a center phase of an intake valve operation angle of the engine;
    an exhaust valve timing control device to vary a center phase of an exhaust valve operation angle of the engine;
    an intake valve operation angle control device to vary an intake valve operation angle of the engine;
    a malfunction detecting device to sense a condition to detect a malfunction of the exhaust valve timing control device; and
    a fail-safe control device to adjust an intake valve opening timing of the engine at or after an exhaust valve closing timing of the engine, upon detection of the malfunction of the exhaust valve timing control device, by operating at least one of the intake valve timing control device and the intake valve operation angle control device;
    wherein the fail-safe control device is configured to inhibit a fail-safe operation responsive to the malfunction of the exhaust valve timing control device when the internal combustion engine is operated in a high engine load region.

2. The variable valve actuating apparatus as claimed in claim 1, wherein the fail-safe control device is configured to adjust an intake valve closing timing toward a bottom dead center by operating at least one of the intake valve timing control device and the intake valve operation angle control device when the malfunction of the exhaust valve timing control device is detected.

3. The variable valve actuating apparatus as claimed in claim 2, wherein the fail-safe control device is configured to fix the intake valve timing control device at an initial position, and to operate the intake valve operation angle control device when the malfunction of the exhaust valve timing control device is detected.

4. The variable valve actuating apparatus as claimed in claim 1, wherein the fail-safe control device is configured to fix the intake valve timing control device at an initial position, and to operate the intake valve operation angle control device when the malfunction of the exhaust valve timing control device is detected.

5. The variable valve actuating apparatus as claimed in claim 1, wherein the intake valve timing control device and the exhaust valve timing control device are identical in an actuation mode.

6. The variable valve actuating apparatus as claimed in claim 1, wherein the fail-safe control device is configured to respond to a restart operation of the engine after detection of the malfunction, by adjusting the intake valve opening timing at or after the exhaust valve closing timing, by operating at least one of the intake valve timing control device and the intake valve operation angle control device.

7. The variable valve actuating apparatus as claimed in claim 1, wherein each of the intake valve timing control device and the exhaust valve timing control device is a hydraulically driven device, and the intake valve operation angle control device is an electrically driven device; and the fail-safe control device is configured to perform a fail-safe operation by operating only the intake valve operation angle control device when the malfunction of the exhaust valve timing control device is detected.

8. The variable valve actuating apparatus as claimed in claim 1, wherein the fail-safe control device is configured to retard the intake valve opening timing to a timing point on or after the exhaust valve closing timing, upon detection of the malfunction of the exhaust valve timing control device, by operating only the intake valve operation angle control device.

9. A variable valve actuation control method for an internal combustion engine, comprising:
   detecting a malfunction of an exhaust valve timing control for the engine;
   performing a fail-safe operation to adjust an intake valve opening timing at or after an exhaust valve closing timing, upon detection of the malfunction of the exhaust valve timing control, by altering at least one of a center phase of an intake valve operation angle and the intake valve operation angle; and
   inhibiting the fail-safe operation responsive to the malfunction of the exhaust valve timing control when the internal combustion engine is operated in a high engine load region.

10. A variable valve actuating apparatus for an internal combustion engine, comprising:
   means for shifting a center phase of an intake valve operation angle of the engine;
   means for shifting a center phase of an exhaust valve operation angle of the engine;
   means for varying the intake valve operation angle of the engine;
   means for detecting a malfunction of the means for shifting the center phase of the exhaust valve operation angle;
   means for performing a fail-safe operation to retard an intake valve opening timing at or after an exhaust valve closing timing, upon detection of the malfunction of the means for shifting the center phase of the exhaust valve operation angle, by operating at least one of the means for shifting the center phase of the intake valve operation angle and the means for varying the intake valve operation angle; and
   means for inhibiting the fail-safe operation responsive to the malfunction of the means for shifting the center phase of the exhaust valve operation angle when the internal combustion engine is operated in a high engine load region.

* * * * *